US010190345B2

(12) United States Patent
McCullough

(10) Patent No.: US 10,190,345 B2
(45) Date of Patent: Jan. 29, 2019

(54) SUCTION CUP CHILD RESTRAINT LOCK FOR SLIDING DOORS/WINDOWS

(71) Applicant: Kyle S. McCullough, St. Charles, IA (US)

(72) Inventor: Kyle S. McCullough, St. Charles, IA (US)

(*) Notice: Subject to any disclaimer, the term of this patent is extended or adjusted under 35 U.S.C. 154(b) by 0 days.

(21) Appl. No.: 14/718,717

(22) Filed: May 21, 2015

(65) Prior Publication Data

US 2016/0340948 A1    Nov. 24, 2016

(51) Int. Cl.
*E05C 7/00* (2006.01)
*B65G 49/06* (2006.01)
*E05B 65/00* (2006.01)
*E05C 19/00* (2006.01)
*F16B 47/00* (2006.01)
*E05C 19/18* (2006.01)
*A45D 42/14* (2006.01)

(52) U.S. Cl.
CPC ........ *E05C 19/188* (2013.01); *E05B 65/0014* (2013.01); *E05C 19/00* (2013.01); *F16B 47/006* (2013.01); *B65G 49/061* (2013.01); *B65G 49/063* (2013.01); *E05C 2007/007* (2013.01); *F16B 47/00* (2013.01)

(58) Field of Classification Search
CPC .... E05C 19/188; E05C 19/006; F16B 47/006; F16B 47/00; F16B 47/003; A47G 1/17; Y10S 292/28; B25B 11/005; B65G 49/061; B65G 49/063; B25J 15/0616

USPC .......... 292/288; 248/205.8, 362, 363, 205.9, 248/206.2, 206.3, 206.4, 220.1
See application file for complete search history.

(56) References Cited

U.S. PATENT DOCUMENTS

| 889,662 | A | * | 6/1908 | Coulter | A61B 17/08 248/206.3 |
| 1,483,640 | A | * | 2/1924 | Manning | B60J 3/02 15/256.5 |
| 1,546,042 | A | * | 7/1925 | Story | B60N 3/12 224/281 |
| 1,757,769 | A | * | 5/1930 | Halbig | H05B 3/84 219/203 |
| 1,799,445 | A | * | 4/1931 | Stansberry | B60J 1/002 135/903 |
| 1,849,338 | A | * | 3/1932 | Stansberry | B60J 3/02 248/206.3 |
| 2,127,154 | A | * | 8/1938 | Burk | B66C 1/0212 16/422 |
| 2,131,687 | A | * | 9/1938 | Kaplan | B66C 1/0212 16/422 |
| 2,165,814 | A | * | 7/1939 | Redmond | G09F 3/18 211/123 |
| 2,315,387 | A | * | 3/1943 | Bambenek | B60R 9/058 224/317 |
| 2,315,566 | A | * | 4/1943 | Watral | A47K 10/04 16/86 A |
| D148,736 | S | * | 2/1948 | Travis | 248/206.3 |
| D154,248 | S | * | 6/1949 | Durbin | 248/206.3 |

(Continued)

*Primary Examiner* — Kristina R Fulton
*Assistant Examiner* — Faria F Ahmad

(57) ABSTRACT

A child restraint device for preventing children from opening sliding doors or sliding windows, the device having a suction cup on each end of a handle, the suction cups being adapted to be attached to sliding door or sliding window panes that are disposed in different planes.

8 Claims, 5 Drawing Sheets

(56) References Cited

U.S. PATENT DOCUMENTS

| | | | | |
|---|---|---|---|---|
| 2,502,714 A * | 4/1950 | Garnett | A01K 97/08 | 224/324 |
| 2,568,714 A * | 9/1951 | Britton | A47K 5/05 | 248/206.3 |
| 2,590,410 A * | 3/1952 | Hurley | D06F 57/12 | 211/123 |
| 2,608,711 A * | 9/1952 | Moore | E05C 17/36 | 16/82 |
| 2,642,603 A * | 6/1953 | Mills | A46B 5/00 | 15/105 |
| 2,730,325 A * | 1/1956 | Van Dusen | A47K 10/10 | 248/205.8 |
| 2,876,980 A * | 3/1959 | Salter | A45C 13/00 | 248/206.3 |
| 2,890,852 A * | 6/1959 | Bradley | B60R 9/058 | 224/309 |
| 2,915,271 A * | 12/1959 | Ruttger | B43L 23/04 | 248/206.3 |
| 3,020,017 A * | 2/1962 | Watson | A61G 13/12 | 248/205.8 |
| 3,059,952 A * | 10/1962 | Wittman | E05C 19/18 | 16/82 |
| 3,137,086 A * | 6/1964 | James | A47K 5/02 | 248/206.3 |
| 3,174,536 A * | 3/1965 | Francis | B60J 11/08 | 160/369 |
| 3,180,604 A * | 4/1965 | Hammer | G03B 42/025 | 248/205.8 |
| 3,593,983 A * | 7/1971 | Csenyi | H05K 13/089 | 269/1 |
| 3,655,193 A * | 4/1972 | Jones | A63F 9/02 | 248/363 |
| 4,037,726 A * | 7/1977 | Schweers | A47H 1/022 | 211/105.5 |
| 4,461,502 A * | 7/1984 | Burgess | E05B 65/0888 | 292/262 |
| D289,793 S * | 5/1987 | Blake | D23/309 | |
| 4,715,629 A * | 12/1987 | Robinson | E05B 15/1607 | 292/256 |
| 4,763,607 A * | 8/1988 | Tominaga | A01K 1/031 | 119/452 |
| 4,792,168 A * | 12/1988 | Kardosh | E05B 65/0888 | 292/288 |
| 4,883,282 A * | 11/1989 | Wolf | A61H 3/04 | 280/43.24 |
| 5,087,005 A | 2/1992 | Holoff | | |
| 5,203,597 A * | 4/1993 | Wheelock | E05B 65/0014 | 292/258 |
| 5,209,533 A * | 5/1993 | Menard | E05C 19/18 | 292/258 |
| 5,224,298 A * | 7/1993 | Horst | E05D 15/22 | 49/506 |
| 5,259,821 A * | 11/1993 | Bryant | F16H 7/14 | 403/108 |
| 5,328,434 A * | 7/1994 | Carroll | A63B 23/0211 | 482/140 |
| 5,419,165 A * | 5/1995 | Perkins | E05B 67/383 | 292/258 |
| 5,431,461 A * | 7/1995 | Andersen, III | E05B 65/0888 | 292/259 R |
| 5,480,204 A * | 1/1996 | Erickson | B65D 67/02 | 206/151 |
| 5,484,081 A * | 1/1996 | Jahn | A47G 23/0216 | 220/483 |
| 5,505,330 A * | 4/1996 | Nunes | A47G 23/0266 | 220/742 |
| D375,891 S * | 11/1996 | Bailey | D8/382 | |
| 5,651,520 A * | 7/1997 | Belokin | F16B 2/185 | 248/205.5 |
| D392,160 S * | 3/1998 | Schmidt | D7/622 | |
| 5,794,871 A * | 8/1998 | Willetts | E05B 13/001 | 292/288 |
| 5,806,816 A * | 9/1998 | Hull | B60N 3/00 | 224/568 |
| 5,810,404 A * | 9/1998 | Horne | E05C 19/182 | 292/288 |
| 5,820,116 A * | 10/1998 | Haese | B25B 5/006 | 269/21 |
| 5,909,758 A * | 6/1999 | Kitamura | A47K 3/003 | 16/406 |
| 5,971,450 A * | 10/1999 | Suarez | E05B 65/0888 | 292/289 |
| D421,556 S * | 3/2000 | Smith | D8/14 | |
| 6,039,371 A * | 3/2000 | Smith | E04F 21/22 | 254/200 |
| 6,101,702 A * | 8/2000 | Claycomb | B25B 11/007 | 254/95 |
| 6,502,794 B1 * | 1/2003 | Ting | E03C 1/06 | 248/205.5 |
| 6,749,160 B1 * | 6/2004 | Richter | F16B 47/006 | 248/206.2 |
| 6,778,086 B2 | 8/2004 | Morrone | | |
| 6,896,228 B1 * | 5/2005 | Lu | A47K 3/003 | 211/105.1 |
| 6,913,412 B1 * | 7/2005 | Byers | A47K 3/001 | 16/82 |
| 7,021,593 B1 * | 4/2006 | Fan | F16B 47/00 | 248/206.2 |
| 7,229,059 B1 * | 6/2007 | Hood | B60R 11/00 | 248/205.8 |
| 7,243,806 B2 * | 7/2007 | Kwok | A47K 10/10 | 211/105.3 |
| 7,270,357 B1 * | 9/2007 | Liao | B65G 7/12 | 294/15 |
| 7,322,092 B2 * | 1/2008 | Adas | B25B 11/007 | 29/468 |
| 7,681,421 B2 * | 3/2010 | Cannon | E05C 19/003 | 200/43.14 |
| 7,731,252 B1 | 6/2010 | Stewart | | |
| 7,753,324 B2 * | 7/2010 | Chien | A47K 17/022 | 248/205.8 |
| 7,850,133 B2 * | 12/2010 | Carnevali | F16B 47/00 | 248/205.5 |
| 7,887,109 B2 * | 2/2011 | Liao | B66C 1/0212 | 294/187 |
| D639,409 S * | 6/2011 | Gilbert | D23/304 | |
| 8,104,809 B1 * | 1/2012 | Mayhugh | B25B 11/007 | 248/205.8 |
| 8,157,227 B2 * | 4/2012 | Zhadanov | F16B 47/006 | 248/205.5 |
| D661,976 S * | 6/2012 | Richter | D8/354 | |
| D665,651 S * | 8/2012 | Richter | D8/354 | |
| 8,235,337 B2 * | 8/2012 | Ostendarp | F16B 47/006 | 248/205.7 |
| 8,251,416 B1 * | 8/2012 | Oberg | B65G 7/12 | 294/16 |
| 8,480,044 B2 * | 7/2013 | Liao | F16B 47/00 | 248/205.5 |
| 8,572,835 B2 * | 11/2013 | Skluzak | B25B 11/007 | 248/205.5 |
| 8,672,309 B2 * | 3/2014 | Birkhauser | B25B 11/007 | 269/21 |
| 8,887,357 B2 * | 11/2014 | Jimenez | B62J 27/00 | 16/421 |
| 8,944,392 B2 * | 2/2015 | Yang | F16M 11/041 | 248/205.5 |
| 8,979,046 B2 * | 3/2015 | Woo | F16B 47/00 | 248/205.5 |
| 9,079,715 B2 * | 7/2015 | Finck | B25B 11/007 | |
| 9,200,667 B1 | 12/2015 | Hsu | F16M 13/02 | |
| 2003/0183593 A1 | 10/2003 | Samelson | A47H 1/08 | 211/105.3 |
| 2004/0099775 A1 * | 5/2004 | Zheng | B60R 11/02 | 248/206.3 |
| 2005/0073162 A1 * | 4/2005 | Handberg | A45F 5/1046 | 294/137 |
| 2007/0075196 A1 * | 4/2007 | Richter | F16B 47/00 | 248/205.8 |

(56) References Cited

U.S. PATENT DOCUMENTS

| | | | |
|---|---|---|---|
| 2007/0290105 A1* | 12/2007 | Liu | F16B 47/006 248/205.5 |
| 2008/0042460 A1* | 2/2008 | Fuchs | A45C 13/30 294/150 |
| 2008/0197250 A1* | 8/2008 | Kaneda | F16M 11/041 248/206.3 |
| 2009/0224117 A1* | 9/2009 | Kaneda | F16B 47/00 248/206.3 |
| 2009/0230262 A1* | 9/2009 | Chiu | B60R 11/04 248/206.3 |
| 2011/0297804 A1* | 12/2011 | Fan | F16B 47/006 248/206.2 |
| 2011/0315839 A1* | 12/2011 | Chen | F16B 47/006 248/205.8 |
| 2012/0018599 A1* | 1/2012 | Tsai | F16B 47/00 248/206.3 |
| 2012/0247022 A1 | 10/2012 | McDonough | |
| 2013/0009414 A1* | 1/2013 | LeClaire | A45F 5/10 294/151 |
| 2013/0075554 A1* | 3/2013 | Tsai | F16B 47/00 248/205.9 |
| 2013/0075570 A1* | 3/2013 | Tsai | F16B 47/00 248/363 |
| 2013/0248665 A1* | 9/2013 | Koklamanis | F16M 11/22 248/206.3 |
| 2014/0346295 A1* | 11/2014 | Song | F16B 47/00 248/205.8 |
| 2017/0066370 A1* | 3/2017 | Bowe | B60Q 1/2615 |
| 2017/0214989 A1* | 7/2017 | Harms | H04R 1/026 |

\* cited by examiner

SUCTION CUP CHILD RESTRAINT LOCK FOR SLIDING DOORS/WINDOWS

TECHNICAL FIELD

This invention relates a child restraint device for preventing children from opening sliding doors or sliding windows.

BACKGROUND

Children too young to be out of the supervision of their parents have been known to open sliding doors or windows in a building to an unsupervised or dangerous area. Some of these young children have learned how to unlock doors and/or windows.

A common way to lock a sliding door is to use a device similar to just the lower leg 2 of a locking device shown in U.S. Pat. No. 7,731,252 to Stewart. But some young children quickly learn how to remove such a locking device, which can simply be called a "broom stick" in order to open a sliding door.

Accordingly, there is a need for a simple and easy to use auxiliary locking device for use by an adult to lock a sliding door or sliding window for the purpose of keeping a child from opening such door or window.

SUMMARY OF THE INVENTION

The present invention relates to a simple auxiliary child restraint lock for sliding doors and window using a pair of suction cups with a handle between them, the suction cups being disposed, at least at times, in different planes in order to attach securely to adjacent sliding door or window panes that lie in different planes.

BRIEF DESCRIPTION OF THE DRAWINGS

The above needs are at least partially met through provision of the apparatus described in the following detailed description, particularly when studied in conjunction with the drawings, wherein:

FIG. 5A is a cross sectional view through one of the suction cups of FIGS. 1-4 showing a cam lever up so that the suction cup is released from a pane of glass upon which it is close to;

Figure 1:
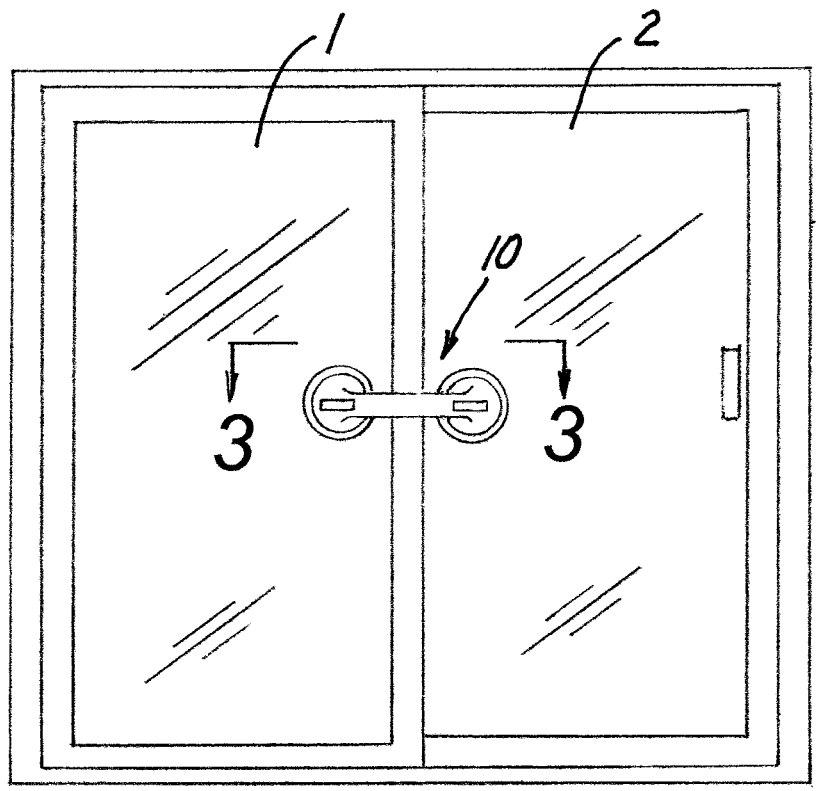
FIG. 1 is an is a side elevational view of a sliding glass door, where typically one of the panes of glass is stationary and the other pane of glass slides in a track from side to side to open or close it.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-5 show an auxiliary child restraint lock 10 for sliding doors and windows constructed in accordance with the present invention.

Figure 2:
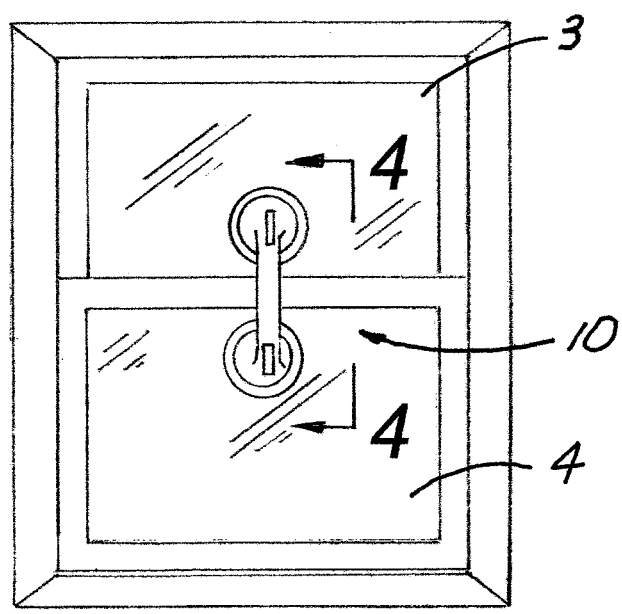
FIG. 2 is an is a side elevational view of a sliding window, where typically one of the panes of glass is stationary and the other pane of glass slides in a track up or down to open or close it.

A preferred embodiment of the present invention 10 is shown in FIG. 1 attached to sliding door panes 1 and 2 to keep the door pane 2 from sliding with respect to the door pane 1, or vise versa. FIG. 2 shows embodiment 10 of the present invention 10 attached to sliding window panes 3 and 4 to keep the window pane 4 from sliding with respect to the window pane 3, or vise versa.

Figure 3:
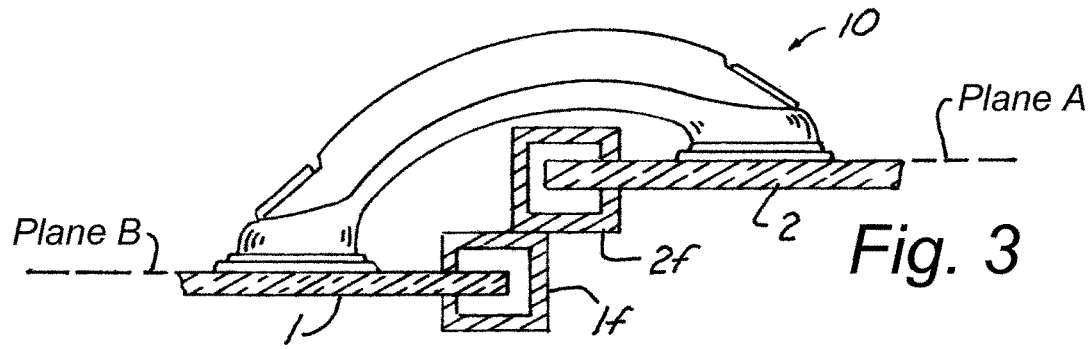
FIG. 3 is a cross sectional view taken along line 3-3 of FIG. 1.
Figure 3A:
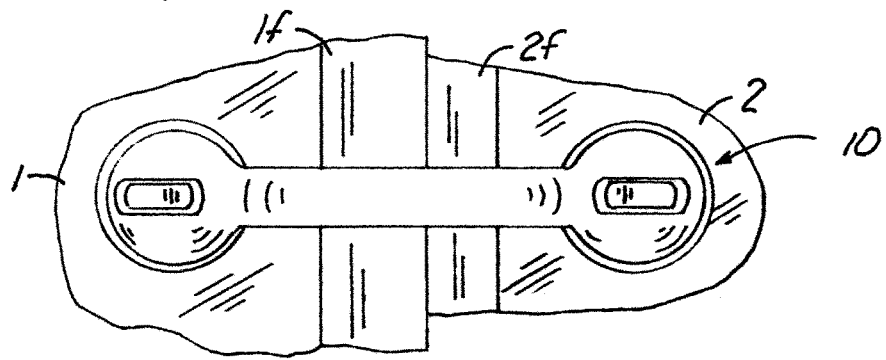
FIG. 3A is an enlarged side elevational view of the suction cup device of FIG. 1.

Referring now to FIGS. 3 and 3A, the handle 10f is rigid and has a first suction cup 10sc attached to a pane of glass 2 along plane A, one side of the glass pane 2. The other suction cup 10sc is attached to the pane of glass 1 along one side of the glass on plane B. A frame 1f holds glass pane 1 in place and a frame 2f holds pane of glass 2 in place. It will be understood, of course, that the panes 1 and 2 can be double or triple panes for insulation purposes so just a single pane is shown for explanation purposes herein.

Figures 4, 4A:
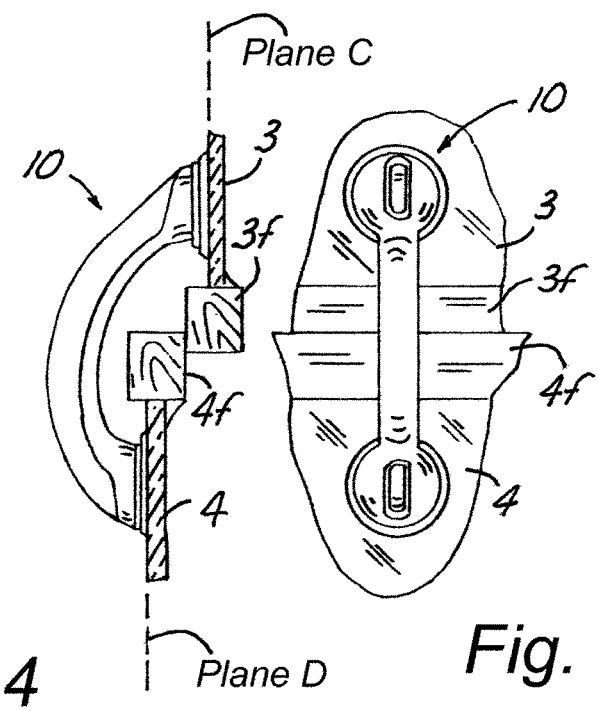
FIG. 4 is a cross sectional view taken along line 4-4 of FIG. 2.
FIG. 4A is an enlarged side elevational view of the suction cup device of FIG. 2.

Referring now to FIGS. 4 and 4A, the handle 10f has one of the suction cups 10sc attached to a pane of window glass 3 along plane C, one side of the window glass pane 3. The other suction cup 10sc is attached to the pane of glass 4 along one side of the window glass on plane D. A frame 3f holds glass pane 3 in place and a frame 4f holds pane of glass 4 in place. It will be understood, of course, that the window panes 3 and 4 can be double or triple panes for insulation purposes so just a single window pane is shown for explanation purposes herein.

Figure 5A:
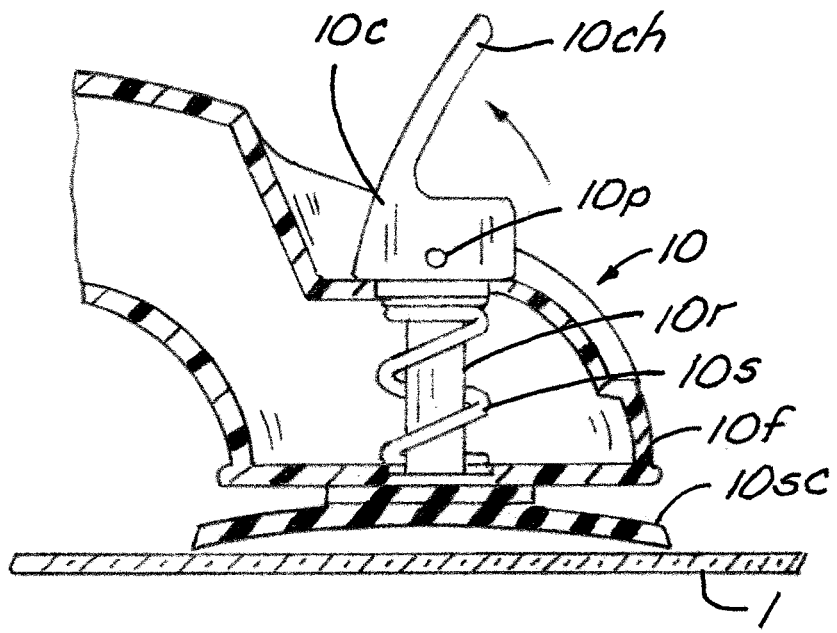

FIG. 5A shows a typical suction cup device 10 of the type which can be used in this invention. But other suction cup structures known in the prior art, such as that shown in U.S. Pat. No. 5,087,005 to Holoff (incorporated herein by reference in its entirety), are fully equivalent to the suction cup structure shown in FIGS. 5A and 5B. In fact, even an old fashioned suction cup that has no mechanical parts to help attach it or disconnect it is intended to be covered by the two words "suction cup" as used in this document.

FIG. 5A shows the suction cup 10c having a rod 10r attached thereto, the rod 10r extending up through an opening in the top of the handle frame 10f and a compression spring 10s pushing rod 10r away from the suction cup 10sc. In FIG. 5A the suction is released that holds the suction cup 10sc from the glass pane 1 when the cam member 10c and handle 10ch is pivoted about a pin 10p to the position shown in FIG. 5A. In order to attach the suction cup 10sc to the glass pane 1, the device shown in FIG. 5A would be pushed down to the position shown in FIG. 5B and the cam 10c would be moved to the FIG. 5B position using handle 10ch. The suction cup 10sc would be held to the glass pane 1 until and unless the cam 10c would be moved back to the FIG. 5A position. Of course, since both suction cups 10sc are shown to be identical on both ends of the handle 10f, only one suction cup 10sc will be described herein.

In operation of the device 10 shown in FIGS. 1-5B to serve as an auxiliary locking restraint for a young child on a sliding door as shown in FIG. 1, an adult person would grasp the handle 10f of the device 10A and push the suction cups 10c against the respective panes of glass 1 and 2 shown in FIGS. 1-5A. Then the cam 10c would be moved from the position shown in FIG. 5A to the position shown in 5B while holding the suction cups 10sc against the respective panes of glass 1 and 2. By placing the device 10 higher than a child can reach it serves as an auxiliary child restraint lock to prevent the child from sliding the door 2 open even if the child has figures out how to otherwise unlock the sliding door.

Figure 5B:
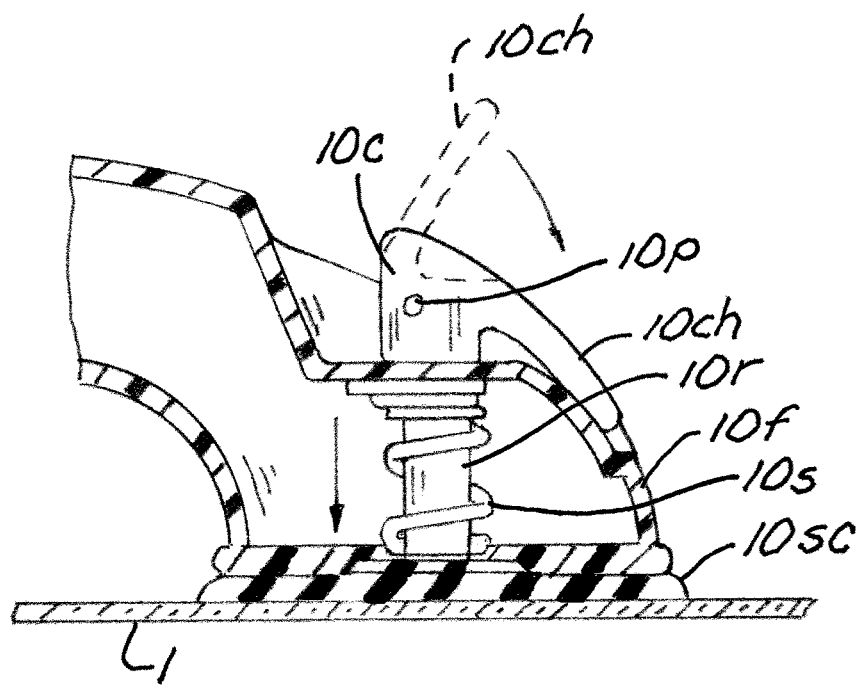
FIG. 5B is a cross sectional view through one of the suction cups of FIGS. 1-4, like FIG. 5A, but showing a cam lever down so that the suction cup is attached to the pane of glass.

In operation of the device 10 shown in FIG. 2 to serve as an auxiliary locking restraint for a young child on a sliding window, an adult person would grasp the handle 10f of the device 10A and push the suction cups 10c against the respective panes of glass 3 and 4 shown in FIGS. 5A and 5B. Then the cam 10c would be moved from the position shown in FIG. 5A to the position shown in 5B while holding the suction cups 10sc against the respective panes of glass 3 and 4. By placing the device 10 higher than a child can reach it serves as an auxiliary child restraint lock to prevent the child from sliding the window 4 open even if the child figures out how to otherwise unlock the sliding window.

Figure 6A:
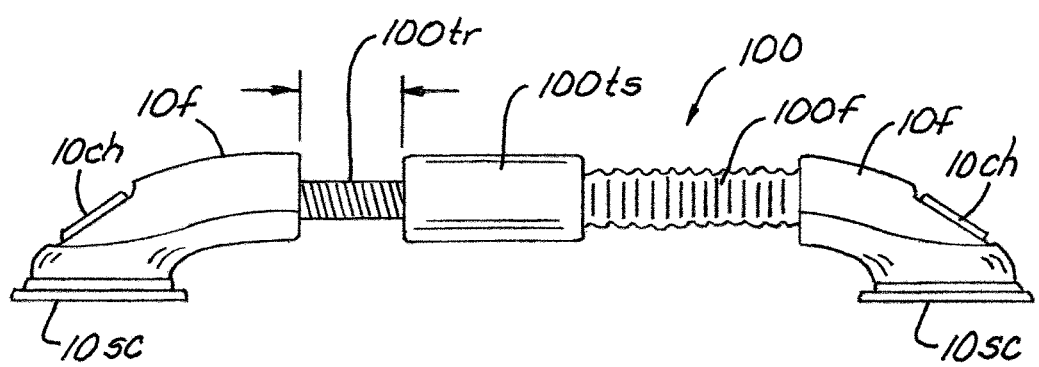
FIG. 6A is a side elevational view of an alternate embodiment of the present invention which has a flexible handle portion so that the two suction cups can attach easily to panes of glass or the like which are either in the same plane or not in the same plane and a threaded member that allows the length of the handle to be lengthened by rotating one suction cup with respect to the other in one rotary direction and shortened by rotating one of the suction cups in the opposite direction.
Figure 6B:
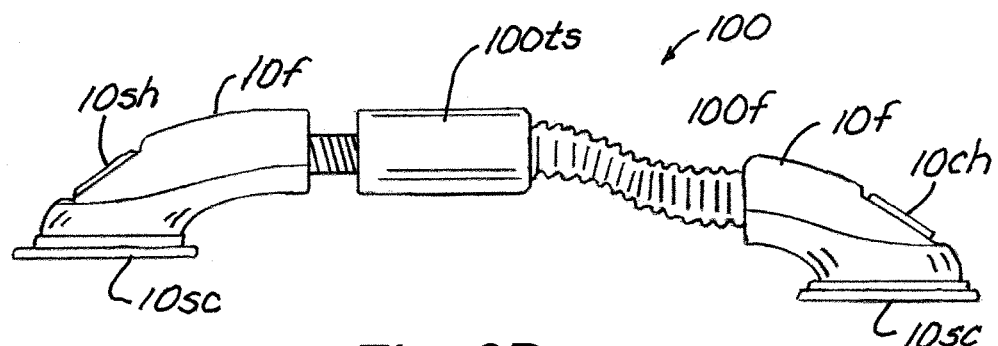
FIG. 6B is a side elevational view of the alternate embodiment of FIG. 6A showing that the handle is flexed so that the two suction cups can attach easily to panes of glass or the like which are not in the same plane and that the threaded member has been used to shorten the handle as compared to the length of the handle in FIG. 6A.

Referring now to FIGS. 6A and 6B, a device 100 is shown having a first and second handle frame ends 10f with first and second suction cups 10sc thereon. A semi-rigid but someone flexible portion 100f is attached between parts 10f and 100ts of the device 10. This allows the device to be used on a flat surface in one plane as shown by U.S. Pat. No. 5,087,005 to Holoff, but also allows it to be used on glass panes in different planes by bending the semi-rigid but flexible portion 100f as shown in FIG. 6B so that it could be used in the same fashion as the device 10 in FIGS. 1 and 2.

An advantage of the device 100 over the device 10 is that the distance between the panes of glass can be different and the flexibility of the device 100 can accommodate those differences, wherein the device of FIGS. 1-5A is built to be used between the most common distances between panes of sliding doors and windows with a certain amount of tolerance from the chosen fixed distances between planes due to the flexible nature of the suction cups 10sc themselves.

The device 100 also has a feature, including a threaded rod 100tr to adjust the length of the handle between the two ends of the handle frame 10f. The threaded rod 100tr extends into the handle part 10f on the left side of FIG. 6A and extends in an internally threaded handle part 100ts. By rotating the right side of the handle including the internally threaded part 100ts in a first rotary direction, the device 100 will become shorter as shown in FIG. 6B. To make the handle of the device 100 longer, i.e. move the suction cups 10sc farther apart, the right side of the device 100, including the internally threaded part 100ts in an opposite rotary direction from the first rotary direction, the suction cups 10sc will again be moved farther apart, i.e. for example back to the length shown in FIG. 6A or longer.

Figure 7:
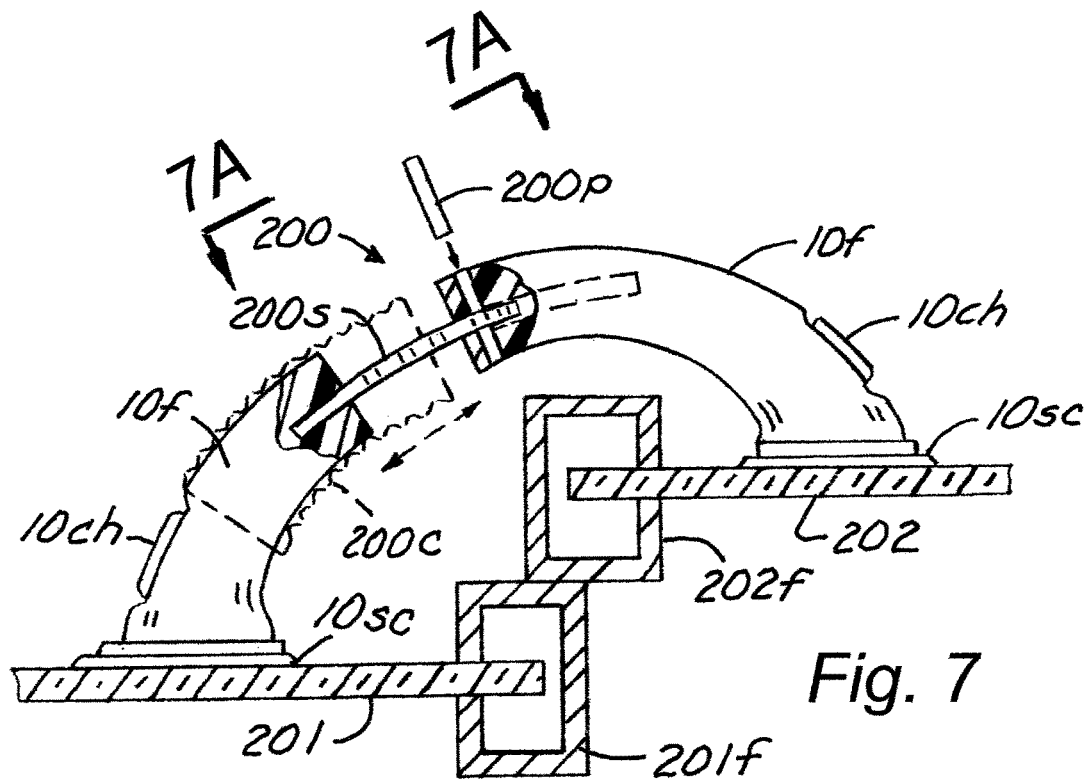
FIG. 7 shows an embodiment like the FIGS. 1-5 device, but it has a lengthening/shortening adjustment device, which is a strap will a plurality of holes in it attached to one part of the handle and the strap can slide in or out of a slot in the other part of the handle and a pin placed into a hole in the handle and through the chosen one of the holes in the strap.
Figure 7A:
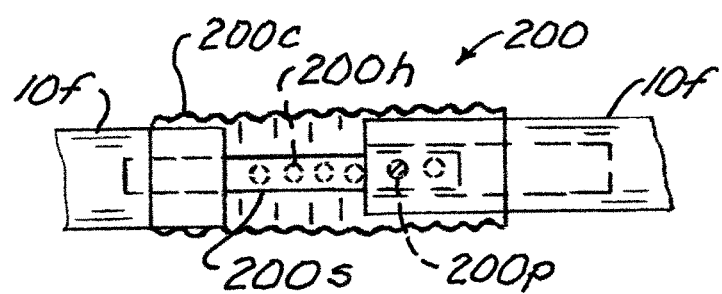
FIG. 7A is a view along line 7A-7A of FIG. 7 to show the length adjusting mechanism.

Turning now to FIG. 7, the device 200 is just like the device 10 of FIGS. 1-5B except that it has an adjusting mechanism including a strap 200s with a plurality of holes 200h in it. The strap 200s is disposed into and fixed with respect to the left hand part of the handle frame 10f and can slide into or out from an opening in the right side handle part 10f as shown in FIG. 7. FIGS. 7 and 7A show how a pin 200p can be placed through an opening perpendicular to the axis of the holes 200h and the pin can be used to lock the two sided of the device 200 in a desires spaced apart distance. This feature is useful when the distance between window panes 201 and 202 can be variable from one siding door to another one, or from one sliding window to a different one. In effect it allows the suction cups 10sc to operate in a more optimum fashion so the that peripheral edges of the suction cup 10sc is more naturally in the same plane as the plane of the corresponding window pane regardless of how far the two window panes are spaced apart, within certain tolerances.

A flexible plastic or rubber sleeve cover 200c, shown in FIGS. 7 and 7A, provides access to the pin 200p and strap 200s when adjusting the length of the handle housing 10f, but allows the pin 200p and strap 200s to be covered up once the appropriate adjustment has been made.

It is noted that this device 10/100/200 can also hold the panes in any desired fixed position, i.e. fully open, fully closed or anywhere in between. So if it is desired to have a door (or window) cracked for air, using the present invention this can still be done while still acting as a restraint to prevent a child from opening the sliding door or window further.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. An apparatus comprising:
   a rigid handle having a first end, a second end and a midpoint between the first and second end;

a first rod attached to the first end, the first rod being disposed along a first axis fixed with respect to the rigid handle, the first rod having a bottom rod end and a top rod end;

a second rod attached to the second end, the second rod being disposed along a second axis fixed with respect to the rigid handle, the second rod having a bottom rod end and a top rod end;

a first suction cup operatively attached to the bottom rod end of the first rod, the first suction cup having a center and having an outermost periphery disposed in a first plane, a first contact face of the first suction cup disposed within the outermost periphery of the first suction cup, the first axis extending through the center of the first suction cup so that the first axis is always perpendicular to the first plane; and a second suction cup operatively attached to the bottom rod end of the second rod, the second suction cup having a center and an outermost periphery of the second suction cup being disposed in a second plane, a second contact face of the second suction cup disposed within the outermost periphery of the second suction cup, the second contact face always facing in the same direction as the first contact face, the second axis extending through the center of the second suction cup so that the second axis is always perpendicular to the second plane;

wherein a first distance between a closest part of the first end of the rigid handle to the largest outermost periphery of the first suction cup is substantially the same as a second distance between a closest part of the second end of the rigid handle to the largest outermost periphery of the second suction cup;

wherein the first and second planes are always parallel to and spaced apart from each other;

wherein the first and second planes of the suction cups are never aligned;

wherein the first axis and the second axis extend through the handle;

wherein the first axis and the second axis are always spaced apart and parallel to each other;

wherein the first axis and the second axis lie in a third plane that extends through the handle;

wherein the first plane and the second plane are both located entirely on the same side of the midpoint of the handle, the first plane and second plane being spaced from the handle; and wherein the handle is symmetrical on each side of the third plane.

2. The apparatus of claim 1 wherein the first end of the rigid handle includes a first planer surface that is parallel to the first plane.

3. The apparatus of claim 2 wherein the second end of the rigid handle includes a second planer surface that is parallel to the second plane.

4. The apparatus of claim 1 wherein a first compression spring is disposed around the first rod.

5. The apparatus of claim 4 wherein a second compression spring is disposed around the second rod.

6. The apparatus of claim 1 wherein the rigid handle is constructed of at least one continuous piece of rigid material from the closest part of the first end of the rigid handle to the closest part of the second end of the rigid handle so that the first and second planes at all times remain parallel to and spaced from each other.

7. The apparatus of claim 1 for use with a sliding door with a first glass pane disposed along the first plane and having the first suction cup attached thereto along said first plane, the siding door having a second glass pane disposed along a second plane and having the second suction cup attached thereto along said second plane.

8. The apparatus of claim 1 for use with a sliding window with a first glass pane disposed along the first plane and having the first suction cup attached thereto along said first plane, the siding window having a second glass pane disposed along a second plane and having the second suction cup attached thereto along said second plane.

\* \* \* \* \*